US012637578B2

(12) United States Patent
Asai et al.

(10) Patent No.: US 12,637,578 B2
(45) **Date of Patent: *May 26, 2026**

(54) INK JET INK COMPOSITION AND RECORDING METHOD

(71) Applicant: SEIKO EPSON CORPORATION, Tokyo (JP)

(72) Inventors: Shintaro Asai, Matsumoto (JP); Hiroaki Kida, Shiojiri (JP); Kei Hiruma, Chino (JP); Tomoyuki Ushiyama, Chino (JP); Mitsunobu Nakatani, Shiojiri (JP); Kenta Tsukada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 542 days.

This patent is subject to a terminal disclaimer.

(21) Appl. No.: 18/174,871

(22) Filed: Feb. 27, 2023

(65) Prior Publication Data

US 2023/0272235 A1 Aug. 31, 2023

(30) Foreign Application Priority Data

Feb. 28, 2022 (JP) ................................ 2022-029279

(51) Int. Cl.
*C09D 11/102* (2014.01)
*C09D 11/322* (2014.01)

(52) U.S. Cl.
CPC .......... *C09D 11/322* (2013.01); *C09D 11/102* (2013.01)

(58) Field of Classification Search
CPC ..... C09D 11/322; C09D 11/102; C09D 11/36; C09D 11/326; C09D 11/38; C09D 11/30; C09D 11/32
USPC ......................................................... 524/437
See application file for complete search history.

(56) References Cited

U.S. PATENT DOCUMENTS

| | | | | |
|---|---|---|---|---|
| 12,305,046 | B2 * | 5/2025 | Hiruma | C09D 11/326 |
| 2008/0182085 | A1 | 7/2008 | Oyanagi et al. | |
| 2012/0287213 | A1 | 11/2012 | Engel et al. | |
| 2013/0088553 | A1 | 4/2013 | Maennig et al. | |
| 2013/0222468 | A1 | 8/2013 | Oyanagi et al. | |
| 2013/0335495 | A1 | 12/2013 | Umebayashi | |
| 2014/0055520 | A1 | 2/2014 | Inumaru et al. | |
| 2014/0127482 | A1 | 5/2014 | Denda et al. | |
| 2014/0220319 | A1 | 8/2014 | Koike et al. | |
| 2015/0010602 | A1 * | 1/2015 | Beck | A61K 9/50 424/59 |
| 2015/0315397 | A1 | 11/2015 | Toyoda et al. | |
| 2016/0145454 | A1 | 5/2016 | Qian et al. | |
| 2017/0058138 | A1 | 3/2017 | Kida et al. | |
| 2018/0265727 | A1 | 9/2018 | Matsuzaki et al. | |
| 2019/0077963 | A1 | 3/2019 | Schilling et al. | |
| 2019/0300732 | A1 | 10/2019 | Kida et al. | |
| 2020/0291212 | A1 | 9/2020 | Harada et al. | |
| 2021/0095142 | A1 | 4/2021 | Takiguchi et al. | |
| 2021/0284856 | A1 | 9/2021 | Takiguchi et al. | |
| 2022/0032618 | A1 | 2/2022 | Ushiyama et al. | |
| 2022/0204785 | A1 * | 6/2022 | Nakatani | C08K 3/08 |
| 2022/0204787 | A1 * | 6/2022 | Kida | C09D 11/36 |
| 2022/0243081 | A1 | 8/2022 | Asai et al. | |

FOREIGN PATENT DOCUMENTS

| | | | |
|---|---|---|---|
| CN | 108624145 | A | 10/2018 |
| EP | 2692806 | A1 | 2/2014 |
| EP | 3546533 | A1 | 10/2019 |
| EP | 4019597 | A1 | 6/2022 |
| EP | 4036180 | A1 | 8/2022 |
| JP | 2007-131741 | A | 5/2007 |
| JP | 2011-508030 | A | 3/2011 |
| JP | 2012-241062 | A | 12/2012 |
| JP | 2012-251070 | A | 12/2012 |
| JP | 2012-255110 | A | 12/2012 |
| JP | 2013-227454 | A | 11/2013 |
| JP | 2013-256665 | A | 12/2013 |
| JP | 2014-168946 | A | 9/2014 |
| JP | 2015-189775 | A | 11/2015 |
| JP | 2015-212018 | A | 11/2015 |
| JP | 2016-011426 | A | 1/2016 |
| JP | 2016-033217 | A | 3/2016 |
| JP | 2016-199694 | A | 12/2016 |
| JP | 2017-025137 | A | 2/2017 |
| JP | 2017-043722 | A | 3/2017 |
| JP | 2019-172862 | A | 10/2019 |
| JP | 2021-054987 | A | 4/2021 |
| KR | 2023-0171306 | A | 12/2023 |
| WO | 2009-083176 | A | 7/2009 |
| WO | 2012-117905 | A1 | 9/2012 |
| WO | 2018-131445 | A1 | 7/2018 |

* cited by examiner

*Primary Examiner* — Hannah J Pak
(74) *Attorney, Agent, or Firm* — Harness, Dickey & Pierce, P.L.C.

(57) ABSTRACT

According to an embodiment of the present disclosure, provided is an ink jet ink composition which is a solvent-based ink, the composition including a metal pigment and an organic solvent, in which the metal pigment is a metal particle having a surface treated with a surface treatment agent, the surface treatment agent contains a compound represented by General Formula (1) and a compound represented by General Formula (2), and a mass ratio of a mass of the compound represented by General Formula (2) to a total mass of the compound represented by General Formula (1) and the compound represented by General Formula (2) is 45% by mass or less.

$$(R—O—)P(O)(OH)_2 \quad (1)$$

$$(R—O—)_2P(O)(OH) \quad (2)$$

(In the formulae, R's each independently represent a hydrocarbon group having 8 or more carbon atoms.)

9 Claims, 1 Drawing Sheet

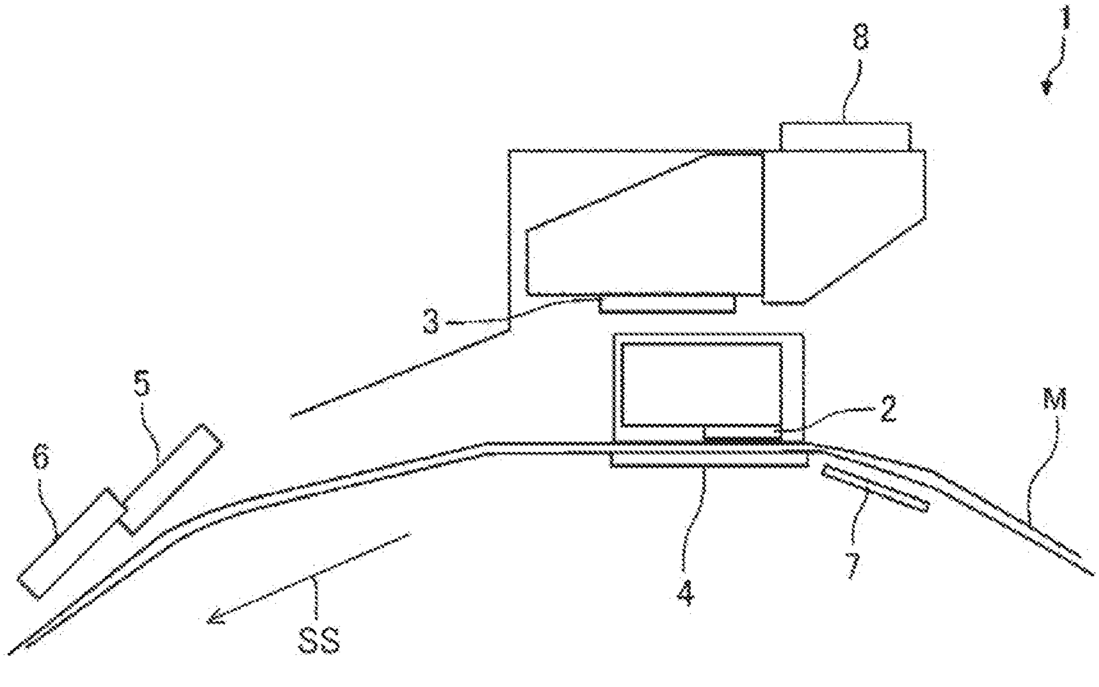
8
1
3
2
5
6
M
4
7
SS

INK JET INK COMPOSITION AND RECORDING METHOD

The present application is based on, and claims priority from JP Application Serial Number 2022-029279, filed Feb. 28, 2022, the disclosure of which is hereby incorporated by reference herein in its entirety.

BACKGROUND

1. Technical Field

The present disclosure relates to an ink jet ink composition and a recording method.

2. Related Art

An ink jet recording method enables recording of a high-definition image with a relatively simple device, and thus rapid development has been made in various fields. Under such circumstances, a recorded material having a metallic gloss by metallic printing has been suggested, and development of an ink having a metallic gloss has been promoted. For example, JP-A-2015-189775 discloses an ink composition formed of a metal pigment subjected to a surface treatment with a fluorine-based compound.

However, such an ink composition is still insufficient in terms of water resistance and metallic glossiness of a recorded material.

SUMMARY

According to an aspect of the present disclosure, there is provided an ink jet ink composition which is a solvent-based ink, the composition including a metal pigment and an organic solvent, in which the metal pigment is a metal particle having a surface treated with a surface treatment agent, the surface treatment agent contains a compound represented by General Formula (1) and a compound represented by General Formula (2), and a mass ratio of a mass of the compound represented by General Formula (2) to a total mass of the compound represented by General Formula (1) and the compound represented by General Formula (2) is 45% by mass or less.

$$(R—O—)P(O)(OH)_2 \quad (1)$$

$$(R—O—)_2P(O)(OH) \quad (2)$$

(In the formulae, R's each independently represent a hydrocarbon group having 8 or more carbon atoms.)

According to another aspect of the present disclosure, there is provided a recording method including jetting the ink jet ink composition according to the above-described aspect using an ink jet method and making the ink jet ink composition adhere to a recording medium.

BRIEF DESCRIPTION OF THE DRAWING

FIGURE is a schematic view showing an example of a recording device that can be used for a recording method according to the present disclosure.

DESCRIPTION OF EXEMPLARY EMBODIMENTS

Hereinafter, embodiments of the present disclosure will be described. The embodiments below will describe examples of the present disclosure. The present disclosure is not limited to the embodiments below and includes various modifications made in a range not departing from the scope of the present disclosure. Further, not all the configurations described below are necessarily essential configurations of the present disclosure.

1. Ink Jet Ink Composition

An ink jet ink composition according to an embodiment of the present disclosure is a solvent-based ink containing a metal pigment and an organic solvent, in which the metal pigment is a metal particle having a surface treated with a surface treatment agent, the surface treatment agent contains a compound represented by General Formula (1) and a compound represented by General Formula (2), and the mass ratio of the mass of the compound represented by General Formula (2) to the total mass of the compound represented by General Formula (1) and the compound represented by General Formula (2) is 45% by mass or less.

$$(R—O—)P(O)(OH)_2 \quad (1)$$

$$(R—O—)_2P(O)(OH) \quad (2)$$

(In the formulae, R's each independently represent a hydrocarbon group having 8 or more carbon atoms.)

In the related art, a metal pigment such as aluminum is subjected to a surface treatment with a fluorine-based surface treatment agent in order to obtain water resistance, leafing properties (suitably aligning the metal pigment in the vicinity of the outer surface of a printed layer), and the like. However, the metal pigment subjected to a surface treatment with such a fluorine-based surface treatment agent is still insufficient in terms of water resistance, dispersion stability, and metallic glossiness of a recorded material that is also related the water resistance and the dispersion stability. For example, when the ink is stored for a long time, the metal pigment (particularly, an aluminum pigment) is oxidized due to a trace amount of water contained in the ink or water entering from the outside so that hydrogen is generated, and thus the storage stability of the ink may be degraded in some cases. Further, in this case, glossiness is also deteriorated due to the oxidation of the metal pigment. Particularly, deterioration of the glossiness is more significant when the recorded material is exposed to a high-temperature environment.

Further, as a result of intensive research conducted by the present inventors, it was found that excellent water resistance (moisture resistance) can be obtained, the glossiness can be maintained, and the storage stability can be improved by using a diester body and a monoester body of specific phosphoric acid alkyl ester as a surface treatment agent of a metal pigment and setting the content ratio between the diester body and the monoester body to be in a predetermined range. Since the monoester body has less steric hindrance, the surface of the metal pigment is likely to be uniformly surface-treated, and particularly dispersion stability and gloss of the metal pigment can be improved. In addition, the diester body has large steric hindrance, and thus water is difficult to approach the surface of the metal pigment and particularly water resistance can be improved. The water resistance and gloss are balanced and can be improved by setting the content ratio between the diester body and the monoester body, which have properties different from each other, to be in a predetermined range. Further, since the ink jet ink composition according to the present embodiment is not required to use the above-described fluorine-based surface treatment agent, the ink jet ink composition is advantageous from the viewpoint of environmental response.

The ink jet ink composition according to the present embodiment is a solvent-based ink. Here, in the present disclosure, the term “solvent-based” denotes that the ink composition contains an organic solvent as a main solvent component. The content of water in the solvent-based ink composition is preferably 3.0% by mass or less, more preferably 1.0% by mass or less, still more preferably 0.5% by mass or less, particularly preferably 0.1% by mass or less, and more particularly preferably 0.01% by mass or less, and the lower limit thereof is 0% by mass. In addition, the content of water with respect to the total amount of the ink jet ink composition may be set to be in the above-described ranges.

The ink jet ink composition according to the present embodiment is an ink that contains a metal pigment and is capable of recording an image having metallic glossiness due to the metal pigment on a recording medium. Such an ink is also referred to as a metallic ink or a metallic lustrous ink. The gloss in the expression of “obtaining excellent gloss” or the like when the ink jet ink composition according to the present embodiment is used may also denote metallic glossiness in some cases.

The ink composition used for an ink jet method is referred to as an ink jet ink composition. Further, the ink jet method is a recording method of jetting liquid droplets such as an ink from a nozzle of an ink jet head such as an ink jet recording device and making the liquid droplets adhere to a recording medium.

Further, in the present specification, when the compound represented by General Formula (1) is not particularly distinguished from the compound represented by General Formula (2), both compounds will also be collectively referred to as “specific phosphoric acid alkyl ester”. Further, the compound represented by General Formula (1) will also be referred to as “monoester body” or “mono-body”, and the compound represented by General Formula (2) will also be referred to as “diester body” or “di-body”.

Hereinafter, each component contained in the ink jet ink composition according to the present embodiment will be described. Further, the ink jet ink composition will also be referred to as “ink composition” or “ink”.

1.1 Metal Pigment

The ink jet ink composition according to the present embodiment contains a metal pigment, and the metal pigment is a metal particle having a surface treated with a surface treatment agent. More specifically, the metal pigment is assumed to be formed such that a moiety of a phosphorus-containing acid group of the surface treatment agent is chemically bonded to the surface of the metal pigment. Here, the surface treatment agent is not limited to being bonded to the surface of the metal particle via a hydrogen bond or by an intermolecular force or the like, and a metal particle containing a residue of the surface treatment agent may be used. That is, the metal pigment is considered to be formed such that the metal particle and the surface treatment agent are bonded via a covalent bond by the reaction of a OH group which can be present on the surface of the metal particle with a moiety of the phosphorus-containing acid group of the surface treatment agent.

Further, the surface treatment agent may be adsorbed on the surface of the metal particle by physical adsorption or the like. In this manner, the surface treatment agent is considered to be adsorbed on the metal particle via a bond or by physical adsorption or the like.

The lower limit of the content of the metal pigment is preferably 0.1% by mass or greater, more preferably 0.2% by mass or greater, still more preferably 0.3% by mass or greater, and particularly preferably 0.5% by mass or greater with respect to the total mass of the ink jet ink composition. The lower limit of the content of the metal pigment is preferably 10% by mass or less, more preferably 5% by mass or less, still more preferably 2.4% by mass or less, particularly preferably 2.2% by mass or less, and more particularly preferably 1.8% by mass or less with respect to the total mass of the ink jet ink composition. When the content of the metal pigment is in the above-described ranges, particularly the glossiness and the rub resistance of a colored portion formed of the ink composition can be improved while the storage stability, the water resistance, and the like of the ink composition are further improved.

1.1.1 Metal Particle

The metal particle is a particle in which at least a part of a site that is visually recognized is formed of a metal material and the vicinity of the outer surface is typically formed of a metal material. The metal particle is a component that greatly affects the appearance of a recorded material produced using an ink composition containing a metal pigment.

The metal particle is not limited as long as at least a region including the vicinity of the surface is formed of a metal material, and for example, the entire metal particle may be formed of a metal material or the metal particle may include a base portion formed of a non-metal material, and a coating film that covers the base portion and is formed of a metal material. Further, an oxide coating film such as a passivation film may be formed on the surface of the metal particle. Problems of water resistance, metallic glossiness, and the like have occurred in the related art even with such a metal particle, but effects of excellent water resistance, excellent metallic glossiness, and the like can be obtained by applying the present disclosure.

As the metal material constituting the metal particle, a single metal, various alloys, or the like can be used. Examples thereof include aluminum, silver, gold, platinum, nickel, chromium, tin, zinc, indium, titanium, iron, copper, and alloys having at least one or more of these metals. Among these metals, the metal particle is formed of preferably aluminum or an aluminum alloy and more preferably aluminum. One of the reasons why aluminum and an aluminum alloy are preferable is that the specific gravity of aluminum and an aluminum alloy is lower than the specific gravity of other metals such as iron. In this manner, since sedimentation of the metal pigment dispersed in the ink extremely slowly proceeds, the ink composition can be stored for a long period of time while occurrence of density unevenness or the like is effectively prevented.

Further, particularly the glossiness and the high-quality appearance of the recorded material can be improved while an increase in production cost of the recorded material produced by using the ink composition containing the metal pigment is suppressed. Aluminum and aluminum alloys originally exhibit particularly excellent glossiness in various metal materials, but the present inventors found that the following problems occur when particles formed of such materials are applied to an ink composition. That is, the present inventors found that the storage stability (water resistance) of the ink composition is particularly decreased and particularly problems such as a decrease in jetting stability due to an increase in viscosity caused by gelation are likely to occur particularly when such an ink composition is used as an ink jet composition. On the contrary, even in a case where the metal pigment is formed of metal particles consisting of aluminum or an aluminum alloy, the occurrence of the above-described problems can be prevented when the surface of the particle is modified with specific phosphoric acid alkyl ester described below. That is, the effects of the present disclosure are more remarkably exhibited when the metal particles consist of aluminum or an aluminum alloy.

The metal particles may have any of a spherical shape, a spindle shape, a needle shape, or the like, but it is preferable that the metal particles have a scaly shape.

In this manner, the main surfaces of the metal particles may be arranged on an object to be treated, to which the ink composition is applied, such that the main surfaces are along with the surface shape of the object to be treated. As a result, there is a tendency that the glossiness and the like that the metal material constituting the metal particles originally has can be more effectively exhibited in a colored body to be obtained, the glossiness and the high-quality appearance of the colored body can be particularly improved, and the rub resistance of the colored body can be particularly improved. Further, in the ink composition containing a metal pigment that has not been surface-modified with specific phosphoric acid alkyl ester, the storage stability (water resistance) is likely to be particularly decreased when the metal particles have a scaly shape, and the jetting stability is likely to be particularly decreased. Further, excellent glossiness and the like due to the metal particles having a scaly shape cannot be exhibited.

On the contrary, in a case where the metal pigment is formed such that the metal particles are surface-modified with specific phosphoric acid alkyl ester as in the ink jet ink composition according to the present embodiment, occurrence of the problems as described above can be prevented even when the metal particles have a scaly shape. That is, the effects of the present disclosure are more remarkably exhibited when the metal particles have a scaly shape.

In the present disclosure, the scaly shape is, for example, a shape in which the area in plan view when the metal particles are observed at a predetermined angle is greater than the area when the metal particles are observed at an angle orthogonal to the observation direction, such as a flat plate shape or a curved plate shape. Particularly, a ratio $S_1/S_0$ of an area $S_1$ [$\mu m^2$] when the metal particles are observed in a direction in which the projected area is maximized, that is, in plan view to an area $S_0$ [$\mu m^2$] when the metal particles are observed in a direction in which the area when observed is maximized in the direction orthogonal to the observation direction is preferably 2 or greater, more preferably 5 or greater, still more preferably 8 or greater, even still more preferably 10 or greater, even still more preferably 20 or greater, and even still more preferably 30 or greater. The upper limit of the ratio $S_1/S_0$ is not particularly limited, but is preferably 1000 or less, more preferably 500 or less, still more preferably 100 or less, and even still more preferably 80 or less.

As this value, for example, an average value of values obtained by observing any 50 particles and performing calculation on these particles can be employed. The observation can be performed by using an electron microscope, an atomic force microscope, or the like.

Alternatively, the volume average particle diameter (D50) and the average thickness described below are used, the units thereof are combined, and the volume average particle diameter (D50)/average thickness may be set to be in the above-described ranges.

When the metal particles have a scaly shape, the average thickness of the metal particles is preferably in a range of 5 to 90 nm. The lower limit of the average thickness of the metal particles is not particularly limited, but is more preferably 10 nm or greater, still more preferably 15 nm or greater, and particularly preferably 20 nm or greater. Further, when the metal particles have a scaly shape, the upper limit of the average thickness of the metal particles is not particularly limited, but is more preferably 70 nm or less, still more preferably 50 nm or less, particularly preferably 30 nm or less, and more particularly preferably 20 nm or less. When the metal particles have a scaly shape and the average thickness is in a range of 5 to 90 nm and preferably in the above-described ranges, the effects obtained in a case where the particles as described above have a scaly shape are likely to be remarkably exhibited.

In addition, the average thickness of the metal particles can be measured by using an atomic force microscope (AFM) in the same manner as that for the average thickness of the metal pigment described below. For example, the average thickness is defined as an average value obtained by measuring any 50 metal particles using atomic force microscopy. That is, it is preferable that the average thickness be an arithmetic average thickness.

The preferable ranges and the measuring method of the volume average particle diameter (D50) of the metal particles can be set to be the same as those for the volume average particle diameter (D50) of the metal pigment described below.

The metal particles may be produced by any method, but when the metal particles are formed of Al, it is preferable that the metal particles be obtained by forming a film formed of Al using a vapor phase film deposition method and crushing the film. In this manner, the glossiness or the like that Al originally has can be effectively exhibited by the colored portion formed of the ink composition of the present disclosure. Further, variations in characteristics between particles can be suppressed. In addition, even relatively thin metal particles can be suitably produced by the above-described method.

When the metal particles are produced by such a method, for example, the metal particles can be suitably produced by forming a film formed of Al on a base material. For example, a plastic film such as polyethylene terephthalate can be used as the base material. Further, the base material may have a release agent layer on a film deposition surface.

Further, it is preferable that the film be crushed by applying ultrasonic vibration to the film in a liquid. In this manner, the metal particles having the above-described particle diameter can be easily obtained, and occurrence of variations in the size, shape, and characteristics between metal particles can be suppressed.

Further, when the film is crushed by the above-described method, alcohols, a hydrocarbon-based compound, an ether-based compound, or a polar compound such as propylene carbonate, γ-butyrolactone, N-methyl-2-pyrrolidone, N,N-dimethylformamide, N,N-dimethylacetamide, dimethylsulfoxide, cyclohexanone, or acetonitrile can be suitably used as the liquid. When such a liquid is used, the productivity of the metal particles is particularly improved while unintentional oxidation or the like of the metal particles is prevented, and variations in the size, shape, and characteristics between particles can be particularly reduced.

Examples of the alcohols include methanol, ethanol, propanol, and butanol. Further, examples of the hydrocarbon-based compound include n-heptane, n-octane, decane, dodecane, tetradecane, toluene, xylene, cymene, durene, indene, dipentene, tetrahydronaphthalene, decahydronaphthalene, and cyclohexylbenzene. Further, examples of the ether-based compound include ethylene glycol dimethyl ether, ethylene glycol diethyl ether, ethylene glycol methyl ethyl ether, diethylene glycol dimethyl ether, diethylene glycol diethyl ether, tetraethylene glycol monobutyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxyethane, bis(2-methoxyethyl)ether, p-dioxane, and tetrahydrofuran.

1.1.2 Surface Treatment Agent

The metal pigment contained in the ink jet ink composition according to the present embodiment is a metal particle having a surface treated with a surface treatment agent, the surface treatment agent contains a compound represented by General Formula (1) and a compound represented by General Formula (2), and the mass ratio of the mass of the compound represented by General Formula (2) to the total mass of the compound represented by General Formula (1) and the compound represented by General Formula (2) is 45% by mass or less.

$$(R—O—)P(O)(OH)_2 \quad (1)$$

$$(R—O—)_2P(O)(OH) \quad (2)$$

(In the formulae, R's each independently represent a hydrocarbon group having 8 or more carbon atoms.)

1.1.2.1 Specific Phosphoric Acid Alkyl Ester

The compound (mono-body) represented by General Formula (1) is a compound in which one of three hydroxyl groups of phosphoric acid is esterified with an R group. Since such a mono-body has less steric hindrance, the surface of the metal pigment is likely to be uniformly surface-treated, and particularly the dispersion stability or gloss of the metal pigment can be improved. The compound (di-body) represented by General Formula (2) is a compound in which two of three hydroxyl groups of phosphoric acid are esterified with an R group. Such a di-body has large steric hindrance, and thus water is difficult to approach the surface of the metal pigment and particularly water resistance can be improved.

In the formulae, R represents a hydrocarbon group having a carbon skeleton with 8 or more carbon atoms, which is a hydrocarbon group having a skeleton formed by 8 or more carbon atoms being continuously bonded. Further, in General Formula (1) and General Formula (2), any carbon atom of the carbon skeleton with 8 or more carbon atoms of R is directly bonded to an oxygen atom of O in (R—O—), and the oxygen atom is directly bonded to a phosphorus atom of P.

Therefore, it is assumed that when the surface treatment agent reacts with the metal particles at a moiety of the hydroxyl group bonded to the phosphorus atom of the surface treatment agent so that the metal particles are surface-modified, R can be present at a position relatively close to the metal particles and the dispersion stability of the metal particles can be improved.

Further, it is assumed that excellent dispersion stability can be imparted to the metal pigment when R represents a relatively long-chain hydrocarbon group.

Examples of the hydrocarbon group having a carbon skeleton with 8 or more carbon atoms include a saturated hydrocarbon group having no double bond nor triple bond between carbon atoms and an unsaturated hydrocarbon group having a double bond or a triple bond between carbon atoms. The hydrocarbon group as R may be an aromatic hydrocarbon group in which the carbon skeleton has an aromatic ring structure or a chain-like or cyclic aliphatic hydrocarbon group. Particularly, the chain-like aliphatic hydrocarbon group is preferable from the viewpoint that the dispersion stability or the like is more excellent. The chain-like aliphatic hydrocarbon group may be branched or linear and is preferably linear from the viewpoint that the dispersion stability, the jetting stability, the gloss, and the like are more excellent. In this case, for example, it is assumed that since the surface of the metal particle can be modified with a plurality of specific phosphoric acid alkyl esters, the effects are sufficiently exhibited.

R represents a hydrocarbon group and thus has a bond of a carbon atom and a hydrogen atom. R represents a hydrocarbon group consisting of a carbon atom and a hydrogen atom when R does not have a substituent. When R represents a chain-like aliphatic hydrocarbon group, examples thereof include an alkyl group, an alkenyl group, and an alkynyl group. In this case, particularly, it is preferable that the ink be a solvent-based ink from the viewpoint that the dispersion stability is more excellent.

R represents a hydrocarbon group having a carbon skeleton with 8 or more carbon atoms and has carbon atoms and hydrogen atoms, and may have at least a bond between the carbon atoms and the hydrogen atoms. Therefore, some hydrogen atoms that the hydrocarbon group as R may have may be substituted with a substituent, and the hydrocarbon group may have one or more unsubstituted hydrogen atoms.

Examples of the substituent include a carboxyl group, a hydroxyl group, an amino group, an oxyalkylene-containing group, and a halogeno group such as a fluoro group. Particularly when some hydrogen atoms are substituted with a fluoro group and the like, higher hydrophobicity can be imparted to the metal pigment, which is more preferable from the viewpoints of the water resistance and the glossiness. Further, the oxyalkylene-containing group is a group having an oxyalkylene structure, and the oxyalkylene structure is also referred to as an alkylene oxide structure.

When some hydrogen atoms that the hydrocarbon group as R may have are substituted with a substituent, the number of substituents is preferably 50% or less and more preferably 10% or less of the number of hydrogen atoms of the hydrocarbon group in a case where R does not have a substituent. Further, the number of substituents is preferably 5 or less, particularly preferably 3 or less, still more preferably 2 or less, and even still more preferably 1 or less. Further, the number of substituents is 0 or greater, and the lower limit of the number of substituents when some hydrogen atoms are substituted with a substituent is 1 or greater. From the viewpoint that the dispersion stability is likely to be further improved, it is preferable that the substituent be provided on the carbon atom at the position farthest from the phosphorus atom in the formulae.

In the ink jet ink composition according to the present embodiment, the compound represented by General Formula (1) and the compound represented by General Formula (2) are hydrocarbon groups having 10 or more carbon atoms as R in the formulae. Further, a hydrocarbon group having 12 to 30 carbon atoms as R in the formulae is more preferable. Further, the number of carbon atoms of the hydrocarbon group as R in the formulae is more preferably in a range of 12 to 25, still more preferably in a range of 12 to 23, even still more preferably in a range of 14 to 22, particularly preferably in a range of 15 to 20, and more particularly preferably in a range of 17 to 20. The number of carbon atoms of the hydrocarbon group as R in the formulae is particularly in a range of 15 to 20 and preferably in the above-described ranges, the dispersion stability (water resistance) and the metallic glossiness are likely to be further improved.

Further, R's in General Formula (1) and General Formula (2) represent preferably hydrogen groups having the same number of carbon atoms and more preferably the same hydrocarbon group. With such R, specific phosphoric acid alkyl ester is assumed to uniformly adhere onto the surface of the metal particle, and the water resistance and the glossiness are likely to be enhanced in a well-balanced manner.

Further, R's in General Formula (1) and General Formula (2) represent any of an alkyl group, an alkenyl group, or an alkynyl group and more preferably a carbon skeleton having 10 or more carbon atoms. In this case, a carbon skeleton having 10 or more and 30 or less carbon atoms is preferable. Further, the number of carbon atoms in the carbon skeleton is preferably 10 or more and 25 or less, more preferably 12 or more and 23 or less, still more preferably 14 or more and 21 or less, and particularly preferably 16 or more and 19 or less. When R's represent any of an alkyl group, an alkenyl group, or an alkynyl group and the number of carbon atoms is in the above-described ranges, the dispersion stability and the metallic glossiness are likely to be further improved.

Specific examples of the compound (mono-body) represented by General Formula (1) include phosphoric acid monooctyl ester, phosphoric acid monolauryl ester, phosphoric acid monoisotridecyl ester, and phosphoric acid monostearyl ester. Among these, one or more selected from these are preferable, one or more selected from phosphoric acid monoisotridecyl ester, and phosphoric acid monostearyl ester are preferable, and phosphoric acid monostearyl ester is still more preferable.

Specific examples of the compound (di-body) represented by General Formula (2) include phosphoric acid dioctyl ester, phosphoric acid dilauryl ester, phosphoric acid diisotridecyl ester, and phosphoric acid distearyl ester. Among these, one or more selected from these are preferable, one or more selected from phosphoric acid diisotridecyl ester and phosphoric acid distearyl ester are more preferable, and phosphoric acid distearyl ester is still more preferable.

Further, the ink jet ink composition according to the present embodiment may contain a surface treatment agent other than the specific phosphoric acid alkyl ester described above as long as the effects of the present disclosure are not impaired. Examples of such a surface treatment agent include a fluorine-based compound. A compound containing fluorine and one or more selected from phosphorus, sulfur, and nitrogen as constituent elements can be preferably used as the fluorine-based compound, and specific examples thereof include fluorinated phosphoric acid, fluorinated carboxylic acid, fluorinated sulfonic acid, and salts thereof.

The surface treatment on the metal particles with the surface treatment agent may be performed, for example, by allowing a liquid to contain the surface treatment agent when a metal film formed by a vapor phase film deposition method is crushed in the liquid to form the metal particles as described above.

1.1.2.2 Content

The mass ratio of the mass of the compound represented by General Formula (2) to the total mass of the compound represented by General Formula (1) and the compound represented by General Formula (2) in the ink jet ink composition according to the present embodiment is 45% by mass or less.

When the ink jet ink composition contains the compound (mono-body) represented by General Formula (1) and the compound (di-body) represented by General Formula (2), which have properties different from each other, as the surface treatment agent at the content ratio within the predetermined range, the water resistance and the gloss are balanced and can be improved.

The upper limit of the mass ratio of the mass of the compound represented by General Formula (2) to the total mass of the compound represented by General Formula (1) and the compound represented by General Formula (2) is preferably 42% by mass or less, more preferably 39% by mass or less, still more preferably 36% by mass or less, even still more preferably 33% by mass or less, particularly preferably 30% by mass or less, more particularly preferably 27% by mass or less, still more preferably 23% by mass, even still more preferably 20% by mass or less, even still more preferably 17% by mass or less, even still more preferably 14% by mass or less, and particularly preferably 11% by mass or less. Further, the lower limit of the mass ratio of the mass of the compound represented by General Formula (2) to the total mass of the compound represented by General Formula (1) and the compound represented by General Formula (2) is not particularly limited, but is preferably 0.1% by mass or greater, more preferably 0.5% by mass or greater, still more preferably 1% by mass or greater, even still more preferably 2% by mass or greater, particularly preferably 3% by mass or greater, more particularly preferably 4% by mass or greater, still more preferably 5% by mass or greater, even still more preferably 6% by mass or greater, even still more preferably 7% by mass or greater, even still more preferably 8% by mass or greater, and particularly preferably 9% by mass or greater. Further, the lower limit of the mass ratio described above is preferably 10% by mass or greater, more preferably 15% by mass or greater, still more preferably 20% by mass or greater, even still more preferably 25% by mass or greater, particularly preferably 30% by mass or greater, and more particularly preferably 35% by mass or greater.

Further, the content of the compound represented by General Formula (2) is preferably in a range of 1% to 20% by mass, more preferably in a range of 3% to 18% by mass, still more preferably in as range of 5% to 16% by mass, particularly preferably in a range of 7% to 14% by mass, and more particularly preferably in a range of 8% to 12% by mass with respect to the total content of the compound represented by General Formula (1) and the compound represented by General Formula (2).

When the mass ratio of the mass of the compound represented by General formula (2) to the total mass of the compound represented by General Formula (1) and the compound represented by General Formula (2) is in the above-described ranges, the water resistance and the gloss are more easily balanced and can be further improved.

Further, the mass ratio between the compound represented by General Formula (1) and the compound represented by General Formula (2) contained in the surface treatment agent can also be referred to as a mass ratio between the compound represented by General Formula (1) and the compound represented by General Formula (2) that are bonded to the surface of the metal particle in the metal pigment contained in the ink composition. Further, the same applies to the content of the compound represented by General Formula (1) and the compound represented by General Formula (2) in the ink composition described below, and the content can also be referred to as the amount of the compound represented by General Formula (1) and the compound represented by General Formula (2) that are bonded to the surface of the metal particle in the metal pigment contained in the ink composition.

The lower limit of the content of the compound represented by General Formula (1) is preferably 0.001% by mass or greater, more preferably 0.005% by mass or greater, still more preferably 0.010% by mass or greater, even still more preferably 0.030% by mass or greater, particularly preferably 0.050% by mass or greater, still more preferably 0.070% by mass or greater, and even still more preferably 0.080% by mass or greater with respect to the total mass of the ink jet ink composition. In addition, the lower limit of the content of the compound represented by General Formula (1) is preferably 0.090% by mass or greater, more preferably 0.100% by mass or greater, still more preferably 0.110% by mass or greater, even still more preferably 0.120% by mass or greater, and particularly preferably 0.130% by mass or greater with respect to the total mass of the ink jet ink composition.

Further, the upper limit of the content of the compound represented by General Formula (1) is not particularly limited, but is preferably 5.0% by mass or less, more preferably 3.0% by mass or less, still more preferably 2.0% by mass or less, even still more preferably 1.5% by mass or less, particularly preferably 1.0% by mass or less, still more preferably 0.800% by mass or less, even still more preferably 0.600% by mass or less, even still more preferably 0.400% by mass or less, particularly preferably 0.200% by mass or less, more particularly preferably 0.150% by mass or less, particularly preferably 0.120% by mass or less, still more preferably 0.100% by mass or less, and even still more preferably 0.095% by mass or less with respect to the total mass of the ink jet ink composition. In addition, the upper limit of the content of the compound represented by General formula (1) is preferably 0.080% by mass or less, more preferably 0.060% by mass or less, still more preferably 0.040% by mass or less, particularly preferably 0.020% by mass or less, and more particularly preferably 0.010% by mass or less with respect to the total mass of the ink jet ink composition.

When the content of the compound represented by General Formula (1) is in the above-described ranges, the dispersion stability and the gloss of the metal pigment can be further improved.

The upper limit of the content of the compound represented by General Formula (2) is preferably 0.0001% by mass or greater, more preferably 0.0005% by mass or greater, still more preferably 0.0010% by mass or greater, even still more preferably 0.0100% by mass or greater, particularly preferably 0.0200% by mass or greater, still more preferably 0.0300% by mass or greater, even still more preferably 0.0400% by mass or greater, even still more preferably 0.0500% by mass or greater, and particularly preferably 0.0550% by mass or greater with respect to the total mass of the ink jet ink composition.

Further, the upper limit of the content of the compound represented by General Formula (2) is not particularly limited, but is preferably 5.0% by mass or less, more preferably 3.0% by mass or less, still more preferably 2.0% by mass or less, even still more preferably 1.5% by mass or less, particularly preferably 1.0% by mass or less, still more preferably 0.800% by mass or less, even still more preferably 0.600% by mass or less, even still more preferably 0.400% by mass or less, particularly preferably 0.200% by mass or less, more particularly preferably 0.150% by mass or less, particularly preferably 0.100% by mass or less, still more preferably 0.090% by mass or less, even still more preferably 0.080% by mass or less, particularly preferably 0.070% by mass or less, and more particularly preferably 0.060% by mass or less with respect to the total mass of the ink jet ink composition. Further, the upper limit of the content of the compound represented by General Formula (2) is preferably 0.050% by mass or less, more preferably 0.040% by mass or less, still more preferably 0.030% by mass or less, even still more preferably 0.020% by mass or less, particularly preferably 0.010% by mass or less, still more preferably 0.009% by mass or less, even still more preferably 0.007% by mass or less, even still more preferably 0.005% by mass or less, even still more preferably 0.003% by mass or less, and particularly preferably 0.002% by mass or less with respect to the total mass of the ink jet ink composition.

When the content of the compound represented by General Formula (2) is in the above-described ranges, the water resistance can be further improved.

The content of the surface treatment agent is preferably in a range of 1% to 100% by mass, more preferably in a range of 1% to 70% by mass, still more preferably in a range of 1% to 50% by mass, even still more preferably in a range of 2% to 40% by mass, particularly preferably in a range of 4% to 30% by mass, more particularly preferably in a range of 6% to 20% by mass, and still more preferably in a range of 8% to 15% by mass with respect to 100% by mass of the total mass of the metal particles. Further, it is preferable that the content of the surface treatment agent be a total content of the compound represented by General Formula (1) and the compound represented by General Formula (2).

When the content of the surface treatment agent is in the above-described ranges with respect to 100% by mass of the total mass of the metal particles, the jetting stability of the ink composition, the dispersion stability and the water resistance of the metal particles, and the glossiness of the colored body formed of the ink composition can be further improved. Further, the jetting stability when the ink jet ink composition is stored for a long period of time or under severe conditions can be further improved.

The content of the compound represented by General Formula (1) is preferably in a range of 0.5% to 90% by mass, more preferably in a range of 0.5% to 70% by mass, still more preferably in a range of 1% to 50% by mass, even still more preferably in a range of 2% to 30% by mass, particularly preferably in a range of 3% to 20% by mass, and more particularly preferably in a range of 4% to 15% by mass with respect to 100% by mass of the total mass of the metal particles.

When the content of the compound represented by General Formula (1) with respect to 100% by mass of the total mass of the metal particles is in the above-described ranges, the dispersion stability and the gloss of the metal pigment can be further improved.

The content of the compound represented by General Formula (2) is preferably in a range of 0.05% to 30% by mass, more preferably in a range of 0.1% to 25% by mass, still more preferably in a range of 1% to 20% by mass, even still more preferably in a range of 2% to 15% by mass, and particularly preferably in a range of 3% to 10% by mass with respect to 100% by mass of the total mass of the metal particles.

When the content of the compound represented by General Formula (2) with respect to 100% by mass of the total mass of the metal particles is in the above-described ranges, the water resistance can be further improved.

1.1.3 Volume Average Particle Diameter and Average Thickness of Metal Pigment

In the ink jet ink composition according to the present embodiment, the volume average particle diameter (D50) of the metal pigment is 0.5 μm or less, and the average thickness of the metal pigment is preferably 30 nm or less.

The lower limit of the volume average particle diameter (D50) of the metal pigment is not particularly limited, but is preferably 0.10 μm or greater, more preferably 0.20 μm or greater, still more preferably 0.25 μm or greater, and particularly preferably 0.30 μm or greater. Further, the upper limit of the volume average particle diameter (D50) of the metal pigment is not particularly limited, but may be 5.00 μm or less, 3.00 μm or less, 1.00 μm or less, 0.70 μm or less, or 0.55 μm or less and is preferably 0.45 μm or less, more preferably 0.40 μm or less, still more preferably 0.35 μm or less, particularly preferably 0.30 μm or less, and more particularly preferably 0.25 μm or less.

In the present disclosure, the volume average particle diameter (D50) denotes the median diameter of the volume distribution obtained by measuring a metal pigment dispersion liquid using a laser diffraction scattering method and is the size of particles showing exactly 50% of the median value as an accumulation when a plurality of measurement results are expressed as an accumulation of the abundance ratio for each size. Further, when the metal particles have a scaly shape, the volume average particle diameter is acquired based on the shape and the size of the metal particles when the shape of the metal particles is converted into a spherical shape.

The lower limit of the average thickness of the metal pigment is not particularly limited, but is preferably 5 nm or greater, more preferably 7 nm or greater, still more preferably 9 nm or greater, particularly preferably 11 nm or greater, and more particularly preferably 13 nm or greater. Further, the upper limit of the average thickness of the metal pigment is not particularly limited, but may be 60 nm or less or 40 nm or less and is preferably 25 nm or less, more preferably 23 nm or less, still more preferably 21 nm or less, particularly preferably 19 nm or less, and more particularly preferably 17 nm or less.

Further, the average thickness of the metal pigment can be measured using an atomic force microscope (AFM). The measurement is not limited, but the average thickness can be measured by an atomic force microscope using NanoNaviE-Sweep (manufactured by SII Nano Technology Inc.). For example, an average value obtained by measuring any 50 metal particles is defined as the average thickness. That is, it is preferable that the average thickness be an arithmetic average thickness.

When the volume average particle diameter (D50) and the average thickness of the metal pigment are in the above-described ranges, occurrence of unintentional color shading or the like in a colored body produced by using the ink composition can be effectively prevented while the storage stability, the water resistance, and the like of the ink composition are further improved, and the glossiness and the rub resistance of the colored body can be further improved.

1.2 Organic Solvent

The ink jet ink composition according to the present embodiment contains an organic solvent. Examples of the organic solvent include esters, alkylene glycol ethers, cyclic esters, nitrogen-containing solvents, alcohols, and polyhydric alcohols. Examples of the nitrogen-containing solvents include cyclic amides and acyclic amides. Examples of the acyclic amides include alkoxyalkylamides.

Examples of the esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxy butyl acetate, and glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

As the alkylene glycol ethers, monoether or diether of alkylene glycol may be used, and alkyl ether is preferable. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers such as ethylene glycol dimethyl ether, ethylene glycol diethylene ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Further, from the viewpoint that the resin in the ink composition is likely to be dissolved or swollen and the friction fastness can be further improved, diether of the alkylene glycol is preferable to monoether of the alkylene glycol.

Examples of the cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decalactone, and compounds in which hydrogen atoms of a methylene group adjacent to a carbonyl group thereof are substituted with an alkyl group having 1 to 4 carbon atoms.

Examples of the alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of the cyclic amides include lactams, and specific examples thereof include pyrrolidones such as 2-pyrrolidone, 1-methyl-2-pyrrolidone, 1-ethyl-2-pyrrolidone, 1-propyl-2-pyrrolidone, and 1-butyl-2-pyrrolidone. These examples are preferable from the viewpoint of promoting film formation of a resin, and 2-pyrrolidone is more particularly preferable.

Examples of the alcohols include compounds in which one hydrogen atom of an alkane is substituted with a hydroxyl group. The number of carbon atoms of the alkane is preferably 10 or less, more preferably 6 or less, and still more preferably 3 or less. Further, the number of carbon atoms of the alkane is 1 or more and preferably 2 or more. The alkane may be linear or branched. Examples of the alcohols include methanol, ethanol, n-propyl alcohol, iso-propyl alcohol, n-butanol, 2-butanol, tert-butanol, iso-butanol, n-pentanol, 2-pentanol, 3-pentanol, and tert-pentanol.

The polyhydric alcohols include two or more hydroxyl groups in a molecule. The polyhydric alcohols can be divided into, for example, alkanediols and polyols.

Examples of the alkanediols include compounds in which an alkane is substituted with two hydroxyl groups. Examples of the alkanediols include ethylene glycol (also referred to as ethane-1,2-diol), propylene glycol (also referred to as propane-1,2-diol), 1,2-butanediol, 1,2-pentanediol, 1,2-hexanediol, 1,2-octanediol, 1,3-propanediol, 1,3-butylene glycol (also referred to as 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, and 2-methyl-2-propyl-1,3-propanediol.

Examples of the polyols include a condensate in which two or more molecules of alkanediols are intermolecularly condensed between hydroxyl groups, and a compound containing three or more hydroxyl groups.

Examples of the condensate in which two or more molecules of alkanediols are intermolecularly condensed between hydroxyl groups include dialkylene glycol such as diethylene glycol or dipropylene glycol, and trialkylene glycol such as triethylene glycol or tripropylene glycol.

The compound containing three or more hydroxyl groups is a compound containing three or more hydroxyl groups with an alkane or a polyether structure as a skeleton. Examples of the compound containing three or more hydroxyl groups include glycerin, trimethylolethane, trimethylolpropane, 1,2,5-hexanetriol, 1,2,6-hexanetriol, pentaerythritol, and polyoxypropylene triol.

The organic solvent may be used alone or in combination of two or more kinds thereof.

Among the above-described organic solvents, the composition contains preferably one or more selected from alkylene glycol ethers and cyclic ethers and more particularly preferably one or more selected from diethylene glycol diethyl ether, tetraethylene glycol monobutyl ether, and γ-butyrolactone.

The content of the organic solvent is preferably 30% by mass or greater, more preferably 40% by mass or greater, still more preferably 50% by mass or greater, even still more preferably 60% by mass or greater, and particularly preferably 70% by mass or greater with respect to the total mass of the ink jet ink composition. The upper limit thereof is less than 100% by mass. Further, the lower limit of the content of the organic solvent with respect to the total mass of the ink jet ink composition is preferably set to be the above-described ranges, and the upper limit thereof is preferably 99% by mass or less and more preferably 98% by mass or less.

1.3 Polyoxyalkylene Amine Compound

It is preferable that the ink jet ink composition according to the present embodiment contain a polyoxyalkylene amine compound. When the ink jet ink composition contains a polyoxyalkylene amine compound, the storage stability of the ink jet ink composition can be further improved, and the jetting stability of the ink jet ink composition and the glossiness of the recorded material to be produced in a case where the ink jet ink composition is stored for a long period of time or under severe conditions can be further improved.

The polyoxyalkylene amine compound is not limited as long as the compound is an amine compound having a polyoxyalkylene structure in a molecule, but at least one of a compound represented by Formula (3), a salt thereof, a compound represented by Formula (4), and a salt thereof is preferable.

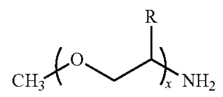

(3)

(In Formula (3), R represents a hydrogen atom or an alkyl group having 3 or less carbon atoms, and x represents an integer of 10 or greater. Further, in Formula (3), the compound may have a plurality of kinds of oxyalkylene units with different conditions for R.)

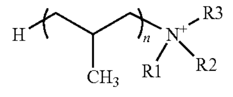

(4)

(In Formula (4), R1, R2, and R3 each independently represent an alkyl group having 3 or less carbon atoms, and n represents an integer of 10 or greater.)

In this manner, the storage stability of the ink jet ink composition can be further improved, and the jetting stability of the ink jet ink composition and the glossiness of the recorded material to be produced when the ink jet ink composition is stored for a long period of time or under severe conditions can be further improved.

R in Formula (3) may represent a hydrogen atom or an alkyl group having 3 or less carbon atoms and represents preferably a hydrogen atom or a methyl group and more preferably a compound represented by Formula (5).

(5)

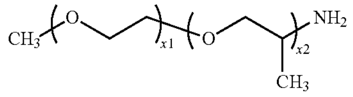

(In Formula (5), X1 and X2 each independently represent an integer of 1 or greater, and X1+X2 is an integer of 10 or greater. Further, in Formula (5), the order of the oxyethylene unit and the oxypropylene unit is not limited.)

In this manner, the storage stability of the ink jet ink composition can be further improved, and the jetting stability of the ink jet ink composition and the glossiness of the recorded material to be produced when the ink jet ink composition is stored for a long period of time or under severe conditions can be further improved.

Further, the lower limit of the value of X1/X2 which is the ratio of X1 to X2 in Formula (5), that is, the ratio of the substance amount of the oxyethylene unit to the substance amount of the oxypropylene unit in a molecule of the polyoxyalkylene amine compound is preferably 0.05, more preferably 0.15, and still more preferably 0.70. Further, the upper limit of the value of X1/X2 is preferably 10.00, more preferably 8.00, and still more preferably 6.00.

Examples of a commercially available product of the polyoxyalkylene amine compound satisfying such conditions include JEFFAMINE M2070 (manufactured by Huntsman Corporation) and GENEMIN (M41/2000) (manufactured by Clariant AG).

As described above, the order of the oxyethylene unit and the oxypropylene unit in Formula (5) is not limited. More specifically, in Formula (5), an amino group is bonded to the terminal of the continuous oxyethylene unit and a methyl group is bonded to the terminal of the continuous oxypropylene unit, but an amino group may be bonded to the terminal of the continuous oxypropylene unit and a methyl group may be bonded to the terminal of the continuous oxyethylene unit. Further, the compound represented by Formula (5) may be a block copolymer or a random copolymer.

In Formula (4), R1, R2, and R3 may each independently represent an alkyl group having 3 or less carbon atoms. Further, it is preferable that R1, R2, and R3 each independently represent a methyl group or an ethyl group and more particularly preferable that one of R1, R2, and R3 represent a methyl group and the remaining two represent an ethyl group.

A compound in which one of R1, R2, and R3 in Formula (4) represents a methyl group and the remaining two represent an ethyl group is represented by Formula (6).

(6)

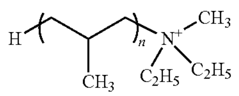

(In Formula (6), n represents an integer of 10 or greater.)

Further, although not shown in Formula (4) and Formula (6), these compounds have anions corresponding to cations shown in these formulae. Examples of the anions include a halide ion such as a chloride ion or a bromide ion, a hydroxide ion, a sulfate ion, a nitrate ion, and a phosphate ion.

The lower limit of the weight-average molecular weight of the polyoxyalkylene amine compound is not particularly limited, but is preferably 300, more preferably 500, still more preferably 800, and most preferably 1000. Further, the upper limit of the weight-average molecular weight of the polyoxyalkylene amine compound is not particularly limited, but is preferably 8000, more preferably 5000, and still more preferably 3000.

The polyoxyalkylene amine compound may be used alone or in combination of two or more kinds thereof.

When the ink jet ink composition contains a polyoxyalkylene amine compound, the lower limit of the content of the polyoxyalkylene amine compound in the ink jet ink composition is not particularly limited, but is preferably 0.01% by mass or greater, more preferably 0.06% by mass or greater, and still more preferably 0.10% by mass or greater. Further, the upper limit of the content of the polyoxyalkylene amine compound in the ink jet ink composition is not particularly limited, but is preferably 3.0% by mass or less, more preferably 1.0% by mass or less, still more preferably 0.5% by mass or less, and particularly preferably 0.3% by mass or less.

Further, the content of the polyoxyalkylene amine compound is preferably in a range of 0.1% to 30% by mass with respect to 100% by mass of the total mass of the metal particles. The lower limit of the content of the polyoxyalkylene amine compound with respect to 100% by mass of the total mass of the metal particles is more preferably 0.5% by mass or greater, still more preferably 1% by mass or greater, even still more preferably 3% by mass or greater, particularly preferably 5% by mass or greater, and more particularly preferably 7% by mass or greater. The upper limit of the content of the polyoxyalkylene amine compound with respect to 100% by mass of the total mass of the metal particles is more preferably 25% by mass or less, still more preferably 20% by mass or less, particularly preferably 17% by mass or less, more particularly preferably 14% by mass or less, and still more preferably 12% by mass or less.

In a case where the content of the polyoxyalkylene amine compound with respect to 100% by mass of the total mass of the metal particles is in the above-described ranges, the storage stability of the ink jet ink composition can be further improved, and the jetting stability of the ink jet ink composition and the glossiness of the recorded material to be produced when the ink jet ink composition is stored for a long period of time or under severe conditions can be further improved.

1.4 Resin

It is preferable that the ink jet ink composition according to the present embodiment contain a resin. The resin functions as a binder. Examples of the resin include an acrylic resin, a rosin-modified resin, a terpene-based resin, a polyester resin, a polyamide resin, an epoxy resin, a vinyl chloride resin, a vinyl chloride-vinyl acetate copolymer, a cellulose-based resin (such as cellulose acetate butyrate or hydroxypropyl cellulose), polyvinyl butyral, polyacryl polyol, polyvinyl alcohol, and a urethane resin. Among these, the ink jet ink composition contains preferably one or more selected from an acrylic resin, a polyester resin, a urethane resin, and a cellulose-based resin and more preferably an acrylic resin. Further, the acrylic resin is a resin obtained by polymerizing at least an acrylic monomer or may be a copolymer resin of an acrylic monomer and other monomers. Examples of other monomers include a vinyl monomer.

The lower limit of the content of the resin is preferably 0.01% by mass or greater, more preferably 0.06% by mass or greater, still more preferably 0.10% by mass or greater, and particularly preferably 0.15% by mass or greater with respect to the total mass of the ink jet ink composition. The upper limit of the content of the resin is preferably 3.0% by mass or less, more preferably 1.0% by mass or less, still more preferably 0.5% by mass or less, and particularly preferably 0.3% by mass or less with respect to the total mass of the ink jet ink composition.

1.5 Other Components

The ink jet ink composition according to the present embodiment may contain other components in addition to the components described above. Examples of such components include a leveling agent, a polymerization accelerator, a polymerization inhibitor, a photopolymerization initiator, a dispersant, a surfactant, a penetration accelerator, a moisturizing agent, a coloring agent, a fixing agent, a fungicide, a preservative, an antioxidant, a chelating agent, a thickener, and a sensitizer.

Preferred examples of the surfactant include a silicone-based surfactant and an acetylene glycol-based surfactant.

2. Recording Method

A recording method according to an embodiment of the present disclosure includes a step of jetting the above-described ink jet ink composition using an ink jet method and making the ink jet ink composition adhere to a recording medium.

According to the recording method of the present embodiment, since a diester body and a monoester body of specific phosphoric acid alkyl ester are used as the surface treatment agent of the metal pigment, and the above-described ink jet ink composition containing the diester body and the monoester body at a content ratio in a predetermined range can be used, excellent water resistance (moisture resistance) is obtained, and the glossiness is excellently maintained, and the storage stability is also excellent.

2.1 Ink Adhesion Step

The recording method according to the present embodiment includes a step of jetting the above-described ink jet ink composition using an ink jet method and making the ink jet ink composition adhere to a recording medium (ink adhesion step).

The ink jet method is a recording method of jetting liquid droplets such as an ink from a nozzle of an ink jet head such as an ink jet recording device and making the liquid droplets adhere to a recording medium. When the ink composition is jetted by an ink jet method, a piezo method, a method of jetting an ink using bubbles formed by heating the ink, or the like can be used, but a piezo method is preferable from the viewpoint that the metal pigment is unlikely to be deteriorated.

The ink composition can be jetted by the ink jet method using a known liquid droplet jetting device.

A colored body formed by the ink composition may have, for example, a predetermined pattern and may be formed on the entire surface of an object to be treated.

The adhesion amount of the ink jet ink composition is preferably in a range of 1 to 10 mg/$inch^2$ and more preferably in a range of 2 to 7 mg/$inch^2$ per unit area of a recording region.

Recording Medium

The recording medium is a substance to be colored by making the ink jet ink composition adhere thereto, that is, an object to be colored.

Examples of the recording medium include an ink absorbing recording medium such as paper or fabric. The ink absorbing recording medium is a recording medium having a recording surface that easily absorbs an ink. Examples of the paper include plain paper, paper used exclusively for ink jet, and corrugated cardboard. Examples of the fabric include natural fibers/synthetic fibers such as cotton, polyester, and wool, and non-woven fabric.

Further, other examples of the recording medium include a non-absorbing recording medium consisting of a plastic material, a metal, glass, ceramics, wood, or the like. The non-absorbing recording medium is a recording medium having a recording surface that is unlikely to absorb an ink. Examples of the recording medium consisting of a plastic material include a plastic film and a plastic sheet. The plastic is not particularly limited, and examples thereof include vinyl chloride, polyester, and polyolefin. Examples of the polyester include polyethylene terephthalate.

Further, other examples of the recording medium also include a low-absorbing recording medium. The low-absorbing recording medium is a recording medium having a recording surface having the second lowest absorbency after the non-absorbing recording medium. Examples of the low-absorbing recording medium include a recording medium having a surface provided with a coating layer (receiving layer) for receiving a liquid, and examples of the recording medium in which the base material is paper include actual printing paper. Examples of the coating layer include a coating layer that is unlikely to absorb an ink and is coated with particles of an inorganic compound together with a binder.

The low-absorbing or non-absorbing recording medium denotes a recording medium having a property of not absorbing a liquid or hardly absorbing a liquid. For example, it is preferable that the non-absorbing or low-absorbing recording medium be "recording medium in which the water absorption amount from the start of contact to 30 $msec^{1/2}$ in the Bristow method is 10 mL/$m^2$ or less". The Bristow method is a method that has been widely used as a method of measuring the liquid absorption amount in a short time and that is also adopted by Japan Technical Association of The Pulp And Paper Industry (JAPAN TAPPI). The details of the test method are described in Standard No. 51 "Paper and Paperboard, Liquid Absorbency Test Method, Bristow Method" of "Paper and Pulp Test Method (2000) by JAPAN TAPPI". Meanwhile, an absorbing recording medium denotes a recording medium that does not correspond to the non-absorbing or low-absorbing recording medium.

Further, the shape of the recording medium is not particularly limited and may be any of a sheet shape, a plate shape, an object shape, or the like.

2.2 Primary Heating Step

The recording method according to the present embodiment may include a primary heating step of heating the ink composition adhered to the recording medium at an early stage.

The primary heating step is a step of heating the ink adhered to the recording medium at an early stage and drying the ink. The primary heating is a heating step for drying at least a part of a liquid medium of the ink adhered to a recording medium at least to an extent that the flow of the ink is reduced.

The primary heating step may be performed such that the ink adheres to a heating recording medium or the ink is heated at an early stage after the adhesion. It is preferable that the ink droplets having landed on the recording medium start heating at the latest 0.5 seconds after the landing of the ink droplets.

Further, it is preferable that the primary heating step be performed on each ink composition to adhere to the recording medium. For example, when the ink adhesion step is performed using two or more ink jet ink compositions, it is preferable that the ink adhesion step be performed on each ink composition to adhere to the recording medium.

It is preferable that the primary heating step is performed by irradiating the recording medium with an IR heater or a microwave or blowing hot air to the recording medium using a platen heater or a fan.

The heating in the primary heating step may be performed at least at any timing of before the ink adhesion step, simultaneously with the adhesion, or early after the adhesion, and it is preferable that the heating be performed simultaneously with the adhesion. In this heating order, the ink adhesion step can be performed. It is particularly preferable that the recording medium be heated and the ink composition adhere to the heated recording medium in the ink adhesion step.

When the recording method includes the primary heating step, since the ink composition on the recording medium can be rapidly dried, occurrence of bleeding of the ink can be prevented, which is preferable. Meanwhile, when the recording method includes the primary heating step, since the ink is rapidly dried, gloss may deteriorate due to insufficient ensuring of the time for leafing of the metal pigment or the jetting stability may deteriorate due to receiving the heat of the primary heating step. However, according to the recording method of the present embodiment, it is preferable that the above-described ink jet ink composition be used even when the primary heating step is performed from the viewpoint of obtaining excellent gloss or excellent jetting stability.

The surface temperature of the recording surface of the recording medium in the primary heating step of heating the ink composition is preferably 30° C. or higher and 60° C. or lower, more preferably 35° C. or higher and 55° C. or lower, and still more preferably 40° C. or higher and 50° C. or lower. It is preferable that the surface temperature of the recording medium be in the above-described ranges from the viewpoint of preventing bleeding and further improving the jetting stability. Further, the surface temperature of the recording medium in the primary heating step is the surface temperature of the recording medium when the ink adheres to the recording medium or the temperature of the recording medium during heating when the recording medium is heated after the adhesion. Further, the surface temperature of the recording medium is a maximum temperature during recording.

2.3 Post-Heating Step

The recording method according to the present embodiment may include a post-heating step (secondary heating step) of heating the recording medium after the ink adhesion step.

The post-heating step is a heating step of completing recording and sufficiently heating the recording medium to the extent that the recorded material can be used. The post-heating step is a heating step for sufficiently drying a solvent component of the ink.

It is preferable that the post-heating step be started longer than 0.5 seconds after the adhesion of the ink to the recording medium. For example, it is preferable that a recording region where the recording medium is present start heating longer than 0.5 seconds after completion of the adhesion of the ink to the recording region.

The recording medium in the post-heating step can be performed by using, for example, an appropriate heating unit. The surface temperature of the recording medium in this case is preferably 50° C. or higher, more preferably 60° C. or higher, still more preferably 70° C. or higher, and even still more preferably 75° C. or higher. The upper limit thereof is not limited, but is preferably 120° C. or lower. Further, the heating temperature is preferably lower than or equal to the softening point of the base material of the recording medium.

2.4 Recording Device

An example of a recording device that can be suitably used for the recording method according to the present embodiment will be described below with reference the accompanying drawing.

Outline of Device Configuration

FIGURE is a schematic cross-sectional view schematically showing a recording device. As shown in FIGURE, an ink jet recording device 1 includes a recording head 2, an IR heater 3, a platen 4, a heating heater 5, a cooling fan 6, a preheater 7, and a ventilation fan 8. Further, the recording head is mounted on a carriage (not shown) and performs main scanning in a front-rear direction of the FIGURE so that the ink adheres to a recording medium M. Further, the platen 4 is provided with a platen heater (not shown). The ink jet recording device 1 includes a control unit (not shown) and performs recording by controlling each unit. Further, the ink is supplied to the recording head 2 from an ink housing body (not shown).

Configuration Related to Ink Jet Head

The recording head 2, which is an ink jet head, is configured to perform recording on the recording medium M by jetting the ink composition from a nozzle of the recording head 2 to adhere to the recording medium M. The recording head 2 shown in FIG. 1*s* a serial type recording head and performs scanning on the recording medium M a plurality of times relatively in a main scanning direction so that the ink adheres to the recording medium M. The recording head 2 is mounted on the carriage (not shown). The recording head 2 performs scanning on the recording medium M a plurality of times relatively in a main scanning direction by an operation of a carriage moving mechanism that allows the carriage to move in a medium width direction (front-rear direction of the FIGURE) of the recording medium M. The medium width direction is a main scanning direction of the recording head 2. The scanning carried out in the main scanning direction is also referred to as main scanning.

Here, the main scanning direction is a direction in which the carriage on which the recording head 2 is mounted moves. In FIGURE, the main scanning direction is a direction intersecting a sub-scanning direction which is a transport direction of the recording medium M indicated by an arrow SS. Further, an image is recorded on the recording medium M by repeatedly performing main scanning on the recording head 2 and sub-scanning which is the transport of the recording medium M a plurality of times.

The ink composition can be jetted from the recording head 2 using a known method of the related art. For example, a method of jetting liquid droplets using vibration of a piezoelectric element, that is, a jetting method of forming ink droplets by mechanical deformation of an electrostrictive element is used.

Primary Heating Mechanism

The ink jet recording device 1 may include a primary heating mechanism that performs the primary heating step of heating the recording medium M when the ink is jetted from the recording head 2 and made to adhere to the recording medium. As the primary heating mechanism, a conduction type heating mechanism, a blast type heating mechanism, a radiation type heating mechanism, or the like can be used. The conduction type heating mechanism conducts heat from a member in contact with the recording medium to the recording medium. Examples thereof include a platen heater. Further, the platen heater is not shown in the FIGURE, but is integrated with the platen 4. The blast type heating mechanism dries the ink by sending normal temperature air or hot air to the recording medium. Examples thereof include a blast fan. The radiation type heating mechanism heats the recording medium by radiating radiation that generates heat to the recording medium. Examples thereof include IR radiation. Although not shown, a heater similar to the platen heater may be provided on a downstream of the platen 4 in the SS direction. These primary heating mechanisms may be used alone or in combination.

For example, the ink jet recording device includes the IR heater 3 and the platen heater as the primary heating mechanism.

Further, when the IR heater 3 is used, the recording medium M can be heated in a radiation manner by infrared rays radiated from the recording head 2 side. In this manner, the recording head 2 is also likely to be heated simultaneously, but the recording medium M can be heated without being affected by the thickness of the recording medium M as compared to when the recording medium M is heated from the rear surface thereof using the platen heater or the like. Further, the primary heating mechanism may include various fans (such as the ventilation fan 8) that apply hot air or air at the same temperature as the temperature of the environment to the recording medium M to dry the ink on the recording medium M.

The platen heater can heat the recording medium M at a position opposing to the recording head 2 via the platen 4. The platen heater is capable of heating the recording medium M in a conduction manner and is used as necessary in the ink jet recording method.

Further, the ink jet recording device 1 may include the preheater 7 that heats the recording medium M in advance before the ink adheres to the recording medium M.

Post-Heating Mechanism

The ink jet recording device may also include a post-heating mechanism that performs the post-heating step of heating the recording medium after the ink adhesion step and drying and fixing the ink.

The heating heater 5 used for the post-heating mechanism dries and solidifies the ink adhered to the recording medium M. When the heating heater 5 heats the recording medium M on which an image has been recorded, the organic solvent and the like contained in the ink can be more rapidly evaporated and scattered. In this manner, a recorded material can be obtained in a shorter time.

Other Configurations

The ink jet recording device 1 may include the cooling fan 6. An ink coating film can be formed on the recording medium M with excellent adhesiveness by drying the ink recorded on the recording medium M and cooling the ink on the recording medium M with the cooling fan 6.

The recording device shown in FIGURE is a serial printer that performs so-called serial type recording. The recording device may be a line printer that includes a line head and performs line type recording.

The line head includes a line array in which a plurality of nozzles are arranged in the width direction of the recording medium and has a length greater than or equal to the width of the recording medium M to be transported, and thus an image can be recorded at once on the recording medium M to be transported in the width direction of the recording medium. Further, recording can be performed by one scanning. In addition, recording performed by scanning twice or more times can be carried out by performing scanning once performed by transporting the recording medium, returning the recording medium in a direction opposite to the transport direction, transporting the recording medium again, and performing scanning again.

Further, the scanning may be performed by the head in which the position with respect to the recording medium to be transported is fixed or the scanning may be performed while the head moves with respect to the recording medium fixed in the platen region.

Further, a recording device capable of performing line type recording can be configured as shown in FIGURE except that the recording head 2 is changed to a line head. Specifically, the heating mechanisms such as the ventilation fan 8, the IR heater 3, the platen heater, and the preheater 7 above the recording head 2 shown in FIGURE may be similarly provided above or below the line head. Further, the recording device may include the heating heater 5 serving as a post-heating mechanism shown in FIGURE, the cooling fan 6, and the like.

3. Examples

Hereinafter, the present disclosure will be described in more detail based on examples, but the present disclosure is not limited to such examples. Hereinafter, is on a mass basis unless otherwise specified.

3.1 Preparation of Ink Jet Ink Composition

Diethylene glycol diethyl ether, tetraethylene glycol monobutyl ether, γ-butyrolactone, and a resin were added to a metal pigment dispersion liquid produced by the following method to have the composition listed in Tables 1 and 2, thereby obtaining an ink jet ink composition of each example and each comparative example.

Method of Producing Metal Pigment Dispersion Liquid

First, a polyethylene terephthalate film having a smooth surface with a surface roughness Ra of 0.02 μm or less was prepared. Next, a release layer was formed on one entire surface of the film by coating the surface with a release resin solubilized by acetone using a roll coater. The polyethylene terephthalate film on which the release layer had been formed was transported into a vacuum deposition device at a speed of 5 m/s to form a film formed of Al with a thickness of 15 nm or 60 nm under reduced pressure. Next, the polyethylene terephthalate film on which the Al film had been formed was immersed in tetrahydrofuran, and ultrasonic vibration at 40 kHz was applied thereto, thereby obtaining a dispersion liquid of metal powder as an aggregate of metal particles made of Al.

The tetrahydrofuran was removed by a centrifuge, and diethylene glycol diethyl ether was added thereto, thereby obtaining a suspension with a metal powder content of 5% by mass. Next, the suspension was treated with a circulation type high-output ultrasonic crusher so that the metal particles were crushed into a predetermined size of each example and each comparative example listed in Tables 1 and 2. Ultrasonic waves at 20 kHz were applied in the treatment.

Next, when a polyoxyalkylene amine compound was used for the suspension, the polyoxyalkylene amine compound was added thereto, and the suspension was subjected to a heat treatment at 55° C. for 1 hour by being irradiated with ultrasonic waves at 40 kHz, and the metal particles were dispersed in a state of primary particles by releasing the aggregation of the metal particles. Here, as the polyoxyalkylene amine compound, a block copolymer in which an amino group was bonded to the terminal of a continuous oxyethylene unit and a methyl group was bonded to the terminal of a continuous oxypropylene unit, a condition that the ratio X1/X2 of X1 to X2 in Formula (5) was 3.1 was satisfied, and the weight-average molecular weight was 2000 was used.

Further, phosphoric acid alkyl ester serving as a hydrophobic phosphoric acid-based surface treatment agent, alkyl phosphonic acid, or fluorine-containing phosphonic acid was added as the surface treatment agent. Further, the suspension was subjected to a heat treatment at 55° C. for 3 hours by being irradiated with ultrasonic waves at 28 kHz, thereby obtaining a metal pigment dispersion liquid.

TABLE 1

| | | | | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|---|---|
| Pigment | Al pigment (D50: 0.3 μm, film thickness: 15 nm) | | | 1.5 | | | 1.5 | 1.5 | 1.5 | 1.5 | 1.5 | 1.5 | 1.5 | 1.5 | 1.5 | 1.5 |
| | Al pigment (D50: 0.5 μm, film thickness: 15 nm) | | | | 1.5 | | | | | | | | | | | |
| | Al pigment (D50: 2.0 μm, film thickness: 15 nm) | | | | | 1.5 | | | | | | | | | | |
| | Al pigment (D50: 3.0 μm, film thickness: 15 nm) | | | | | | | | | | | | | | | |
| | Al pigment (D50: 1.0 μm, film thickness: 15 nm) | | | | | | | | | | | | | | | |
| | | | Number of carbon atoms of R | | | | | | | | | | | | | |
| Phosphoric acid alkyl ester | Phosphoric acid monoester | Phosphoric acid monobutyl ester | 4 | | | | | | | | | | | | | |
| | | Phosphoric acid monooctyl ester | 8 | 0.090 | 0.090 | 0.090 | | | | | | | | | | |
| | | Phosphoric acid monolauryl ester | 12 | | | | 0.090 | 0.105 | | | | | | | | |
| | | Phosphoric acid monoisotri-decyl ester | 13 | | | | | | 0.090 | | | | | | | |
| | | Phosphoric acid monostearyl ester | 18 | | | | | | | 0.090 | 0.105 | 0.135 | 0.135 | 0.135 | 0.009 | 0.350 |
| | Phosphoric acid diester | Phosphoric acid dibutyl ester | 4 | | | | | | | | | | | | | |
| | | Phosphoric acid dioctyl ester | 8 | 0.060 | 0.060 | 0.060 | | | | | | | | | | |
| | | Phosphoric acid dilauryl ester | 12 | | | | 0.060 | 0.045 | | | | | | | | |

TABLE 1-continued

| | | | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|---|
| | Phosphoric acid diisotridecyl ester | 13 | | | | | | 0.060 | | | | | | | |
| | Phosphoric acid distearyl ester | 18 | | | | | | | 0.060 | 0.045 | 0.015 | 0.015 | 0.015 | 0.001 | 0.150 |
| Alkyl phosphonic acid | Dodecyl phosphonic acid | | | | | | | | | | | | | | |
| Fluorine-containing phosphonic acid | FHP | | | | | | | | | | | | | | |
| Poly (EO/PO) amine | JEFFAMIN M2070 | | 0.15 | 0.15 | 0.15 | 0.15 | 0.15 | 0.15 | 0.15 | 0.15 | 0.15 | 0.0015 | 0.45 | 0.15 | 0.15 |
| Resin | UC3000 | | 0.2 | 0.2 | 0.2 | 0.2 | 0.2 | 0.2 | 0.2 | 0.2 | 0.2 | 0.2 | 0.2 | 0.2 | 0.2 |
| Solvent | DEDG | | Remaining amount | Remaining amount | Remaining amount | Remaining amount | Remaining amount | Remaining amount | Remaining amount | Remaining amount | Remaining amount | Remaining amount | Remaining amount | Remaining amount | Remaining amount |
| | BTGH | | 10 | 10 | 10 | 10 | 10 | 10 | 10 | 10 | 10 | 10 | 10 | 10 | 10 |
| | γBL | | 2.5 | 2.5 | 2.5 | 2.5 | 2.5 | 2.5 | 2.5 | 2.5 | 2.5 | 2.5 | 2.5 | 2.5 | 2.5 |
| | Total | | 100.0 | 100.0 | 100.0 | 100.0 | 100.0 | 100.0 | 100.0 | 100.0 | 100.0 | 100.0 | 100.0 | 100.0 | 100.0 |
| % by mass di-body/(di-body + mono-body) | | | 40.0 | 40.0 | 40.0 | 40.0 | 30.0 | 40.0 | 40.0 | 30.0 | 10.0 | 10.0 | 10.0 | 10.0 | 10.0 |
| Total amount of phosphoric acid alkyl ester | | | 0.150 | 0.150 | 0.150 | 0.150 | 0.150 | 0.150 | 0.150 | 0.150 | 0.150 | 0.150 | 0.150 | 0.010 | 0.500 |
| Evaluation | Gloss (initial stage) | | C | B | A | B | A | B | B | A | AA | AA | B | C | AA |
| | Storage stability in atmospheric opening system | | B | A | A | B | B | B | A | B | C | C | C | C | B |
| | Rub resistance in high-temperature and high-humidity environment | | C | A | A | B | B | B | A | B | C | C | C | C | C |
| | Jetting stability | | B | B | C | B | B | A | A | A | A | B | A | A | B |

TABLE 2

| | | | | Example 14 | Example 15 | Example 16 | Example 17 | Example 18 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|---|---|
| Pigment | Al pigment (D50: 0.3 μm, film thickness: 15 nm) | | | 1.5 | 1.5 | 1.5 | | | 1.5 | 1.5 | 1.5 | 1.5 | 1.5 | 1.5 | 1.5 | 1.5 |
| | Al pigment (D50: 0.5 μm, film thickness: 15 nm) | | | | | | | | | | | | | | | |
| | Al pigment (D50: 2.0 μm, film thickness: 15 nm) | | | | | | | | | | | | | | | |
| | Al pigment (D50: 3.0 μm, film thickness: 15 nm) | | | | | | 1.5 | | | | | | | | | |
| | Al pigment (D50: 1.0 μm, film thickness: 15 nm) | | | | | | | 1.5 | | | | | | | | |
| | | | Number of carbon atoms of R | | | | | | | | | | | | | |
| Phosphoric acid alkyl ester | Phosphoric acid monoester | Phosphoric acid monobutyl ester | 4 | | | | | | 0.090 | | | | | | | |
| | | Phosphoric acid monooctyl ester | 8 | 0.090 | | 0.090 | | | | | | | | | | |
| | | Phosphoric acid monolauryl ester | 12 | | | | | | | | | | | | | |
| | | Phosphoric acid monoisotri-decyl ester | 13 | | | | | | | | | | | | | |
| | | Phosphoric acid monostearyl ester | 18 | | 0.140 | | 0.105 | 0.105 | | 0.015 | 0.150 | | | | 0.075 | |
| | Phosphoric acid diester | Phosphoric acid dibutyl ester | 4 | | | | | | 0.060 | | | | | | | |
| | | Phosphoric acid dioctyl ester | 8 | 0.060 | | | | | | | | | | | | |
| | | Phosphoric acid dilauryl ester | 12 | | | | | | | | | | | | | |

TABLE 2-continued

| | | | Example 14 | Example 15 | Example 16 | Example 17 | Example 18 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|---|
| | Phosphoric acid diisotridecyl ester | 13 | | | | | | | | | | | | | |
| | Phosphoric acid distearyl ester | 18 | | 0.010 | 0.060 | 0.045 | 0.045 | | 0.135 | | | | | 0.075 | 0.150 |
| Alkyl phosphonic acid | Dodecyl phosphonic acid | | | | | | | | | | 0.15 | | | | |
| Fluorine-containing phosphonic acid | FHP | | | | | | | | | | | 0.15 | | | |
| Poly (EO/PO) amine | JEFFAMIN M2070 | | 0 | 0.15 | 0.15 | 0.15 | 0.15 | 0.15 | 0.15 | 0.15 | 0.15 | 0.15 | 0.15 | 0.15 | 0.15 |
| Resin | UC3000 | | 0.2 | 0.2 | 0.2 | 0.2 | 0.2 | 0.2 | 0.2 | 0.2 | 0.2 | 0.2 | 0.2 | 0.2 | 0.2 |
| Solvent | DEDG | | Remaining amount | Remaining amount | Remaining amount | Remaining amount | Remaining amount | Remaining amount | Remaining amount | Remaining amount | Remaining amount | Remaining amount | Remaining amount | Remaining amount | Remaining amount |
| | BTGH | | 10 | 10 | 10 | 10 | 10 | 10 | 10 | 10 | 10 | 10 | 10 | 10 | 10 |
| | γBL | | 2.5 | 2.5 | 2.5 | 2.5 | 2.5 | 2.5 | 2.5 | 2.5 | 2.5 | 2.5 | 2.5 | 2.5 | 2.5 |
| | Total | | 100.0 | 100.0 | 100.0 | 100.0 | 100.0 | 100.0 | 100.0 | 100.0 | 100.0 | 100.0 | 100.0 | 100.0 | 100.0 |
| % by mass di-body/(di-body + mono-body) | | | 40.0 | 6.7 | 40.0 | 30.0 | 30.0 | 40.0 | 90.0 | 0.0 | — | — | — | 50.0 | 100.0 |
| Total amount of phosphoric acid alkyl ester | | | 0.150 | 0.150 | 0.150 | 0.150 | 0.150 | 0.150 | 0.150 | 0.150 | 0.000 | 0.000 | 0.000 | 0.150 | 0.150 |
| Evaluation | Gloss (initial stage) | | C | AA | B | A | C | D | D | A | A | D | D | D | D |
| | Storage stability in atmospheric opening system | | A | C | B | B | B | A | A | D | D | A | D | A | A |
| | Rub resistance in high-temperature and high-humidity environment | | A | C | B | B | B | A | A | D | D | A | D | A | A |
| | Jetting stability | | C | AA | B | C | C | A | C | A | A | D | A | B | C |

The components listed in Tables 1 and 2 will be described.

Pigment

"D50" in the tables denotes the volume average particle diameter (D50) and was measured by using MICROTRAC MT-3300 (manufactured by MicrotracBEL Corp., laser diffraction scattering type particle size distribution measuring device). Further, "film thickness" denotes an average thickness, and was obtained by performing measurement on any 50 metal pigments using NanoNaviE-Sweep (manufactured by SII Nano Technology Inc.) by an atomic microscope method and averaging the measured values. Further, the measurement of the volume average particle diameter (D50) and the average thickness was performed on the pigment which had been subjected to the surface treatment.

Surface Treatment Agent

Phosphoric Acid Alkyl Ester

In the tables, "number of carbon atoms of R" denotes the number of carbon atoms of the hydrocarbon group as R in General Formula (1) or General Formula (2).

$$(R—O—)P(O)(OH)_2 \quad (1)$$

$$(R—O—)_2P(O)(OH) \quad (2)$$

(In the formulae, R's each independently represent a hydrocarbon group having 8 or more carbon atoms.)

Phosphoric acid monobutyl ester: compound that does not correspond to specific phosphoric acid alkyl ester, "JAMP-4", manufactured by Johoku Chemical Co., Ltd.

Phosphoric acid monooctyl ester: compound represented by General Formula (1) (number of carbon atoms of R in the formula: 8), "JAMP-8EH", manufactured by Johoku Chemical Co., Ltd.

Phosphoric acid monolauryl ester: compound represented by General Formula (1) (number of carbon atoms of R in the formula: 12), "JAMP-12", manufactured by Johoku Chemical Co., Ltd.

Phosphoric acid monoisotridecyl ester: compound represented by General Formula (1) (number of carbon atoms of R in the formula: 13), "Phoslex A-13" (manufactured by SC Organic Chemical Co., Ltd.), which is a mixed product of a mono-body and a di-body, was isolated and used.

Phosphoric acid monostearyl ester: compound represented by General Formula (1) (number of carbon atoms of R in the formula: 18), "Phoslex A-18" (manufactured by SC Organic Chemical Co., Ltd.), which is a mixed product of a mono-body and a di-body, was isolated and used.

Phosphoric acid dibutyl ester: compound that does not correspond to specific phosphoric acid alkyl ester, manufactured by Tokyo Chemical Industry Co., Ltd., (product code: P0260)

Phosphoric acid dioctyl ester: compound represented by General Formula (2) (number of carbon atoms of R in the formula: 8), manufactured by Tokyo Chemical Industry Co., Ltd., (product code: P0811)

Phosphoric acid dilauryl ester: compound represented by General Formula (2) (number of carbon atoms of R in the formula: 12), "JP-212", manufactured by Johoku Chemical Co., Ltd.

Phosphoric acid diisotridecyl ester: compound represented by General Formula (2) (number of carbon atoms of R in the formula: 13), "Phoslex A-13" (manufactured by SC Organic Chemical Co., Ltd.), which is a mixed product of a mono-body and a di-body, was isolated and used.

Phosphoric acid distearyl ester: compound represented by General Formula (2) (number of carbon atoms of R in the formula: 18), "Phoslex A-18" (manufactured by SC Organic Chemical Co., Ltd.), which is a mixed product of a mono-body and a di-body, was isolated and used.

Alkyl Phosphonic Acid

Dodecyl phosphonic acid: compound that does not correspond to specific phosphoric acid alkyl ester, manufactured by Tokyo Chemical Industry Co., Ltd., (product code: D4809) Fluorine-containing phosphonic acid FHP: 2-(perfluorohexyl)ethyl phosphonic acid, compound that does not correspond to specific phosphoric acid alkyl ester, manufactured by Unimatec Co., Ltd.

Poly(EO/PO)Amine

JEFFAMINE M2070: polyoxyalkylene amine compound, CAS 83713-01-3, manufactured by Huntsman Corporation, ratio X1/X2 of X1 to X2 in Formula (5) is 3.1, weight-average molecular weight of 2000

Resin

UC3000: manufactured by Toagosei Co., Ltd., acrylic resin Solvent

DEDG: diethylene glycol diethyl ether

BTGH: tetraethylene glycol monobutyl ether

γBL: γ-butyrolactone

In the tables, "di-body/(di-body+mono-body)" denotes phosphoric acid diester/(phosphoric acid diester+phosphoric acid monoester).

Further, the ink jet ink composition of each example did not contain a surface treatment agent when the dispersion medium remaining after the isolation of the metal pigment from the dispersion liquid of the metal pigment which had been subjected to the surface treatment was analyzed. Therefore, "di-body/(di-body+mono-body)" in each example in the tables can also be referred to as the mass ratio of the surface treatment agent adhered to the metal particles contained in the ink composition.

3.2 Evaluation Method 3.2.1 Gloss (Initial Stage)

The ink jet ink composition of each example and each comparative example, which had been obtained in the above-described manner, was applied to a polyvinyl chloride film (Mactac 5829R, manufactured by Mactac) using a bar coater (#7). Thereafter, the film was dried on a hot plate at 60° C. for 10 minutes, thereby obtaining a recorded material. The glossiness of the recorded portion of the obtained recorded material at a tilt angle of 20° was measured using a gloss meter (MINOLTA MULTI GLOSS 268), and the glass was evaluated according to the following criteria. The metallic glossiness is more excellent as the value increases.

Evaluation Criteria

AA: The glossiness was 650 or greater

A: The glossiness was 600 or greater and less than 650

B: The glossiness was 500 or greater and less than 600

C: The glossiness was 400 or greater and less than 500

D: The glossiness was 300 or greater and less than 400

E: The glossiness was less than 300

3.2.2 Storage Stability in Atmospheric Opening System

The ink jet ink composition of each example and each comparative example, which had been obtained in the above-described manner, was stored in an ink pack and allowed to stand in a constant temperature tank at 50° C. for 7 days. Here, the test was performed by allowing each ink to contain 0.1% by mass of water by assuming a trace amount of water and water entering during the storage for a long time as impurities. Thereafter, the volume average particle diameter (D50) of the metal pigment was measured using a particle size distribution meter (MT 3300EXII, manufactured by Microtrac), and the evaluation was performed according to the following criteria by comparing the rates of increase in particle diameter between measured values and the particle diameters at the initial stage. In addition, it can be said that the water resistance of the metal pigment is more excellent as the rate of increase in volume average particle diameter (D50) decreases.

Evaluation Criteria

A: The rate of increase in particle diameter was less than 3%

B: The rate of increase in particle diameter was 3% or greater and less than 5%

C: The rate of increase in particle diameter was 5% or greater and less than 10%

D: The rate of increase in particle diameter was 10% or greater 3.2.3 Rub Resistance in High-Temperature and High-Humidity Environment The recorded material of each example and each comparative example was obtained in the same manner as in "gloss (initial stage)" test. The recorded material was allowed to stand in a constant temperature bath (temperature of 40° C. and humidity of 100%) for 24 hours, and the rub resistance was evaluated using a Gakushin type Rubbing Fastness Tester (trade name, "AB-301", manufactured by TESTER SANGYO CO., LTD.) in conformity with JIS K 5701 (ISO 11628). That is, cotton fabric was placed on the recorded surface of the recorded material, the cotton fabric was reciprocated 20 times with a load of 500 g to rub the surface, and the glossiness of the rubbed recorded surface of the recorded material at a tilt angle of 20° was measured using a glossiness meter (MINOLTA MULTI GLOSS 268). The evaluation criteria are as follows. The evaluation was performed based on the rate of decrease in glossiness from the reference value by setting the glossiness measured before the recorded material was allowed to stand in a constant temperature tank, as the reference value (100%).

Evaluation Criteria

A: The rate of decrease in glossiness was less than 5%

B: The rate of decrease in glossiness was less than 10%

C: The rate of decrease in glossiness was less than 20%

D: The rate of decrease in glossiness was greater than 20%

3.2.4 Jetting Stability

An ink jet printer (SC-580650 modified machine, manufactured by Seiko Epson Corporation) was prepared. A liquid droplet jetting device as shown in FIGURE was obtained and installed in a chamber (thermal chamber). The ink jet ink composition of each example and each comparative example, which had been obtained in the above-described manner, was prepared, the liquid droplets were continuously jetted from each nozzle of the ink jet head (recording head 2) in a state where the drive waveform of a piezo element was optimized in an environment of 25° C. and 50% RH, and each ink composition was observed at a position separated from the nozzle by 0.8 mm in the jetting direction.

In the flight image of liquid droplets 40 seconds after the start of jetting, the number of nozzles in which the ink droplets were not jetted or which were clearly bent by 25% or greater of the distance from adjacent nozzles was counted and collectively defined as the number of defective nozzles, and the evaluation was performed according to the following criteria. Further, the number of defective nozzles is the proportion (%) of the defective nozzles in the total number of nozzles.

Evaluation Criteria

AA: The number of defective nozzles was less than 3%

A: The number of defective nozzles was 3% or greater and less than 5%

B: The number of defective nozzles was 5% or greater and less than 10%

C: The number of defective nozzles was 10% or greater and less than 20%

D: The number of defective nozzles was 20% or greater 3.3 Evaluation Results

The evaluation results are listed in Tables 1 and 2.

As listed in Tables 1 and 2, the ink jet ink composition of each example which was a solvent-based ink containing a metal pigment and an organic solvent, in which the metal pigment was a metal particle having a surface treated with a surface treatment agent, the surface treatment agent contained a compound represented by General Formula (1) and a compound represented by General Formula (2), and the mass ratio of the mass of the compound represented by General Formula (2) to the total mass of the compound represented by General Formula (1) and the compound represented by General Formula (2) was 45% by mass or less, had excellent water resistance and excellent metallic glossiness.

Based on the comparison between Example 1 and Comparative Example 1, when the ink composition contained specific phosphoric acid alkyl ester in which the number of carbon atoms of R was 8 or more, both the glossiness and the water resistance were excellent.

Based on the comparison between Example 7 and Comparative Examples 2 to 8, when the ink composition contained specific phosphoric acid alkyl ester and the mass ratio between the mono-body and the di-body was in a predetermined range, both the glossiness and the water resistance were excellent.

As shown in the results of Examples 1 to 3 and 17, it was found that as the volume average particle diameter D50 of the pigment increased, the glossiness was enhanced, but the jetting stability was likely to be deteriorated. Further, as shown in the results of Examples 8 and 18, the glossiness was further enhanced as the film thickness of the pigment decreased.

As shown in the results of Examples 1, 4, 6, 7, and 16, both the glossiness and the water resistance were excellent in various specific phosphoric acid alkyl esters.

As shown in the results of Examples 7 to 9 and 15, both the glossiness and the water resistance were excellent within a wide range of the mass ratio between the mono-body and the di-body in the specific phosphoric acid alkyl ester.

As shown in the results of Examples 1 and 14, when the ink jet ink composition contained a polyoxyalkylene amine compound, the jetting stability was likely to be enhanced.

As shown in the results of Examples 9 to 11, when the ink jet ink composition contained a predetermined content of a polyoxyalkylene amine compound, the glossiness or the jetting stability were likely to be enhanced.

As shown in the results of Examples 9, 12, and 13, both the glossiness and the water resistance were excellent within a wide range of the content of the specific phosphoric acid alkyl ester.

Further, in Example 13, it was found that the effect due to a high content of the specific phosphoric acid alkyl ester increased in a liquid medium.

The following contents are derived from the embodiments described above.

According to one aspect, the ink jet ink composition is a solvent-based ink containing a metal pigment and an organic solvent, in which the metal pigment is a metal particle having a surface treated with a surface treatment agent, the surface treatment agent contains a compound represented by General Formula (1) and a compound represented by General Formula (2), and the mass ratio of the mass of the compound represented by General Formula (2) to the total mass of the compound represented by General Formula (1) and the compound represented by General Formula (2) is 45% by mass or less.

$$(R—O—)P(O)(OH)_2 \quad (1)$$

$$(R—O—)_2P(O)(OH) \quad (2)$$

(In the formulae, R's each independently represent a hydrocarbon group having 8 or more carbon atoms.)

In one aspect of the ink jet ink composition described above, the content of the compound represented by General Formula (2) may be in a range of 1% to 20% by mass with respect to the total content of the compound represented by General Formula (1) and the compound represented by General Formula (2).

In any one of the aspects of the ink jet ink composition described above, the compound represented by General Formula (1) and the compound represented by General Formula (2) may be hydrocarbon groups having 15 to 20 carbon atoms as R in the formulae.

In any one of the aspects of the ink jet ink composition described above, the metal particle may consist of aluminum or an aluminum alloy.

In any one of the aspects of the ink jet ink composition described above, the content of the surface treatment agent may be in a range of 1% to 50% by mass with respect to the total mass of 100% by mass of the metal particle.

In any one of the aspects of the ink jet ink composition described above, the metal particle may have a scaly shape.

In any one of the aspects of the ink jet ink composition described above, the volume average particle diameter (D50) of the metal pigment may be 0.5 μm or less, and the average thickness of the metal pigment may be 30 nm or less.

In any one of the aspects of the ink jet ink composition described above, the ink jet ink composition may contain a polyoxyalkylene amine compound.

In the aspect of the ink jet ink composition containing a polyoxyalkylene amine compound, the content of the polyoxyalkylene amine compound may be in a range of 0.1% to 30% by mass with respect to 100% by mass of the total mass of the metal particle.

According to one aspect, a recording method includes a step of jetting the ink jet ink composition according to any one of the aspects using an ink jet method and making the ink jet ink composition adhere to a recording medium.

The present disclosure is not limited to the above-described embodiments, and various modifications can be made. For example, the present disclosure has configurations that are substantially the same as the configurations described in the embodiments, for example, configurations with the same functions, the same methods, and the same results as described above or configurations with the same purposes and the same effects as described above. Further, the present disclosure has configurations in which parts that are not essential in the configurations described in the embodiments have been substituted. Further, the present disclosure has configurations exhibiting the same effects as the effects of the configurations described in the embodiments or configurations capable of achieving the same purposes as the purposes of the configurations described in the embodiments. Further, the present disclosure has configurations in which known techniques have been added to the configurations described in the embodiments.

What is claimed is:

1. An ink jet ink composition which is a solvent-based ink, the composition comprising:

a metal pigment; and an organic solvent, wherein the metal pigment is a metal particle having a surface treated with a surface treatment agent, the surface treatment agent contains a compound represented by General Formula (1) and a compound represented by General Formula (2), and a mass ratio of a mass of the compound represented by General Formula (2) to a total mass of the compound represented by General Formula (1) and the compound represented by General Formula (2) is 45% by mass or less, $$(R—O—)P(O)(OH)_2 \quad (1)$$

$$(R—O—)_2P(O)(OH) \quad (2)$$

in the formulae, R's each independently represent a hydrocarbon group having 8 or more carbon atoms.

2. The ink jet ink composition according to claim 1, wherein a content of the compound represented by General Formula (2) is in a range of 1% to 20% by mass with respect to a total content of the compound represented by General Formula (1) and the compound represented by General Formula (2).

3. The ink jet ink composition according to claim 1, wherein the compound represented by General Formula (1) and the compound represented by General Formula (2) are hydrocarbon groups having 15 to 20 carbon atoms as R in the formulae.

4. The ink jet ink composition according to claim 1, wherein the metal particle consists of aluminum or an aluminum alloy.

5. The ink jet ink composition according to claim 1, wherein a content of the surface treatment agent is in a range of 1% to 50% by mass with respect to a total mass of 100% by mass of the metal particle.

6. The ink jet ink composition according to claim 1, wherein the metal particle has a scaly shape.

7. The ink jet ink composition according to claim 1, wherein a volume average particle diameter (D50) of the metal pigment is 0.5 μm or less, and an average thickness of the metal pigment is 30 nm or less.

8. The ink jet ink composition according to claim 1, further comprising:

a polyoxyalkylene amine compound.

9. The ink jet ink composition according to claim 8, wherein a content of the polyoxyalkylene amine compound is in a range of 0.1% to 30% by mass with respect to 100% by mass of the total mass of the metal particle.

* * * * *